United States Patent [19]
Block et al.

[11] 3,891,743
[45] June 24, 1975

[54] FREE-FLOWING SULFUR PRODUCT

[75] Inventors: Michael J. Block; Donald C. Young, both of Fullerton, Calif.

[73] Assignee: Union Oil Company of California, Brea, Calif.

[22] Filed: Aug. 30, 1972

[21] Appl. No.: 285,040

[52] U.S. Cl. ............... 423/267; 423/567; 423/578
[51] Int. Cl. ............................................ C01b 17/02
[58] Field of Search ........... 423/267, 567, 577, 578; 71/31

[56] References Cited
UNITED STATES PATENTS

| | | | |
|---|---|---|---|
| 1,823,188 | 9/1931 | Bushnell | 423/578 |
| 2,061,185 | 11/1936 | Ceccon | 423/567 |

OTHER PUBLICATIONS

G. Nickless, "Inorganic Sulfur Chemistry," 1968, p. 243, QD 181 S1N5.

Primary Examiner—G. O. Peters
Attorney, Agent, or Firm—Richard C. Hartman; Dean Sandford; Michael H. Laird

[57] ABSTRACT

Powdered sulfur of greatly improved free-flowing properties is prepared by subjecting the sulfur in a molten condition to an oxidizing treatment and thereafter solidifying the sulfur and grinding it into a powdered sulfur product. The powdered sulfur product is useful in conventional applications, for use on soil or plants as a nutrient, or as a pesticide or fungicide. It is believed that the oxidizing treatment eliminates from the sulfur trace to residual quantities of hydrogen sulfide which are believed to cause the caking problem.

8 Claims, No Drawings

FREE-FLOWING SULFUR PRODUCT

DESCRIPTION OF THE INVENTION

This invention relates to the preparation of powdered sulfur and, in particular, to the preparation of powdered sulfur from sour gas sulfur.

BACKGROUND

Major uses of elemental sulfur are as a plant nutrient and as a pesticide, particularly as a fungicide. The sulfur can be applied as an aqueous suspension; however, it is more commonly applied, particularly in its pesticidal uses, as a dust or dry powder. The sulfur is commonly subdivided to a fine particle size, typically having at least 50 weight percent passing a 200 mesh screen for nutrient uses and having 98 weight percent passing a 325 mesh screen for pesticidal uses. The grinding is done at centralized manufacturing plants and the resulting sulfur powders are bagged and shipped to distributors for sale to the ultimate consumer. Substantial difficulties are encountered in handling the sulfur because the sulfur agglomerates or cakes into hard, compact masses. This compaction of the powdered sulfur is accentuated in the normal handling and storage wherein the bags of the material are commonly stacked to heights of about 25 bags resulting in a fairly substantial compaction force being applied to the lower layers of bags.

While all sulfur powders are prone to compact and cake under these conditions, it has been noted that the problem is particulary acute with sulfur powders which have been prepared from elemental sulfur obtained from the oxidation of hydrogen sulfide bearing gases. This sulfur, commonly referred to as sour gas sulfur, is obtained from various hydrocarbon streams such as natural gas and refinery gas streams which contain appreciable quantities of hydrogen sulfide. In treatment of these gases, the hydrogen sulfide is commonly oxidized to elemental sulfur which is recovered from the gas stream.

The problem of caking or compaction of the sulfur powders after their manufacture has received a considerable amount of attention. Various investigators have proposed incorporating solid inert particles such as silica, talcum, magnesium carbonates, calcium phosphates, zinc salts, ground oyster shells, etc., in the powdered sulfur to separate the sulfur particles. Other investigators have suggested the incorporation of hydrocarbons or heterocyclic or aromatic amines in the ground sulfur. The presence of the various materials in sufficient amounts to prevent caking reduces the purity of the resulting sulfur product and, in some instances, can be a detriment to the biocidal effectiveness of the sulfur.

BRIEF DESCRIPTION OF THE INVENTION

We have now found that the tendency of sulfur powders to compact and to cake can be greatly reduced or entirely eliminated by treatment of the sulfur while it is molten with a minor amount of an oxidizing agent. It is believed that the caking tendency of sulfur is attributable to the presence in the sulfur of trace to minor amounts of hydrogen sulfide. It is believed that the hydrogen sulfide slowly reacts with sulfur dioxide which is also present on the surface of the particles to form sulfur and this sulfur could function as a binder to cement or compact the particles together. It has been observed that the caking tendency can be greatly accentuated by the introduction of hydrogen sulfide into the molten sulfur prior to its solidification and grinding. Our observations that the caking tendency of the sulfur can be greatly decreased by treatment of the sulfur while in a molten state with oxidizing agents such as sulfur dioxide, nitrogen oxides, oxygen, air, etc., is believed to be the result of the oxidation of hydrogen sulfide by these agents. The oxidation treatment can be performed with the sulfur in a molten state and at ambient pressures.

DETAILED DESCRIPTION OF THE INVENTION

The amount of hydrogen sulfide that can be present in the sulfur can vary considerably. Frasch sulfur, i.e., mined sulfur, is generally relatively free of hydrogen sulfide although trace amounts can be present. Sour gas sulfur can contain up to the saturation level of hydrogen sulfide at the melting temperatures of sulfur. This is about 0.1 weight percent. Generally, the amount of hydrogen sulfide will be somewhat less, up to about 0.05 weight percent.

Oxidizing agents which are useful in the treatment of this invention are those that can oxidize hydrogen sulfide to sulfur or sulfur dioxide at temperatures at or above the melting point temperature of the sulfur, i.e., about 120°C. The preferred agents are those which are gaseous at atmospheric pressure and at a temperature of 120°C. so that any excess quantities of the agent can be removed from the molten sulfur simply by flashing it at atmospheric pressure. Also, it is preferred to employ oxidizing agents which do not react to form residual adulterants or contaminants in the sulfur.

Various oxidizing agents which can be used include sulfuric acid, nitric acid, perchloric acid, etc. These acids, which are liquid at the treatment temperature and atmospheric pressure, can be used at high concentration or strength to minimize the amount of adulterant added to the sulfur, e.g., above about 50 percent and preferably above about 90 percent acid. Fuming sulfuric acid can also be used.

The preferred oxidizing agents are those which are gaseous at atmospheric pressure and the melting point temperature of sulfur. This preferred class includes: molecular oxygen, ozone, sulfur dioxide, nitric oxide, nitrogen dioxide, dinitrogen tetroxide and mixtures thereof. The oxidizing agent or mixture of agents can be diluted with inert diluents such as nitrogen, carbon dioxide, etc.

The amount of oxidizing agent used can be at least about 0.2, preferably at least about 0.5 weight parts per 100 parts of molten sulfur. Any excess oxidizing agent can usually be flashed from the molten sulfur and recycled, if desired, for further contacting, particularly when using the aforementioned gaseous agents. When the excess oxidizing agent can not be readily removed from the molten sulfur or when such removal is economically prohibitive, the amount of oxidizing agent used can be limited to an amount no greater than 10, preferably 5, calculated as weight parts undiluted oxidizing agent per 100 part of molten sulfur.

Since it is believed that the treatment functions to eliminate troublesome hydrogen sulfide from the sulfur by its oxidation, a more precise proportionation of the amount of oxidizing agent can be based on the amount of hydrogen sulfide in the sulfur. Often, however, the concentration of the hydrogen sulfide will not be known with accuracy. The amount of oxidizing agent based on the hydrogen sulfide present can be at least about 0.5, preferably at least 1.0, equivalent weight per mol weight of hydrogen sulfide. The maximum amount that can be used, when it is necessary or desirable to limit the amount of oxidizing agent present, can be no greater than 3.0, preferably no greater than 2.0 equivalent weights per mol weight of hydrogen sulfide.

The treatment of the sulfur is performed with the sulfur in a molten condition, i.e., at a temperature above its melting point of 119°–120°C. The temperature can be from about 119° to about 200°C., preferably from 120° to about 160°C., and most preferably from 149° to about 154°C. Generally, the lower temperatures within the aforeindicated ranges are employed. Since the rate of oxidation of any trace quantities of hydrogen sulfide is sufficiently rapid at the indicated temperatures, heating to higher temperatures is not necessary or economically desirable.

The treatment can be performed at pressures from about 0.1 to about 100 atmospheres; preferably the treatment is performed at a pressure from 1 to about 10 atmospheres and, most preferably, is performed at atmospheric pressure. The oxidation rate of the hydrogen sulfide is very rapid provided that thorough mixing of the oxidizing agent and sulfur is achieved. The reaction is mass transfer limited and any improvements in the mixing of oxidizing agent and sulfur which result in enhanced mass transfer will reduce the contacting time necessary to eliminate the hydrogen sulfide. Use of superatmospheric pressures can accelerate the rate of oxidation as well as the use of stirring and dispersing means to enhance mixing of the oxidizing agent and molten sulfur.

The oxidation can be performed batchwise or in a continuous process using conventional processing equipment to effect thorough intermixing of the sulfur and oxidizing agent. If the oxidizing agent is gaseous, it can be purged into a vessel containing a pool of molten sulfur. The molten sulfur can also be passed into contact with the oxidizing agent in a continuous fashion. The contacting is maintained for a period of time from 1 to about 500 minutes, preferably from 5 to about 200 minutes and thereafter the molten sulfur is removed from the contacting and is handled in a conventional manner. The oxidation of the molten sulfur can be performed at any point prior to its solidification in the manufacture of the sulfur from hydrocarbon gases containing hydrogen sulfide or, if desired, sulfur which has solidified can be remelted and subjected to the aforementioned treatment.

The solidified sulfur is thereafter ground to a fine degree of subdivision, depending on its intended use. If it is to be used as soil sulfur, it can be ground so that fifty weight percent of the powder will pass a 200 mesh screen. For pesticidal applications, the sulfur is ground to produce powders having an average particle diameter from 0.001 to about 0.01 inch and having a weight majority passing a 325 mesh screen. Preferably, the sulfur is ground to a fineness meeting dusting sulfur requirements, i.e., having at least 98 weight percent passing a 325 mesh screen.

In the preparation of sulfur powders, the solidified sulfur can be comminuted to an intermediate particle size by crushing and thereafter milled to the desired size range with various mills having rollers which grind the material, e.g., ball mills, ring or roller mills, etc. This grinding is customarily performed under an inert atmosphere such as flue gas to preclude dangers of explosions of the finely subdivided sulfur dust formed in the grinding operation. Regardless of the technique employed for the preparation of the sulfur powders, it has been found that the treatment of the sulfur with an oxidizing agent while it is in the molten state substantially reduces the tendency of the powdered product to cake or to compact into hard shapes.

DESCRIPTION OF BEST MODE OF PRACTICE

Sulfur dioxide is employed as the oxidizing agent and is pumped into the molten sulfur product line of a conventional sulfur recovery unit wherein hydrogen sulfide is separated from a hydrocarbon gas and is oxidized to sulfur. The sulfur dioxide is pressured to about 75 psig to maintain it as a liqiud and is passed through a flow meter and flow control valve which proportions its flow relative to the flow of molten sulfur in the product line.

The sulfur dioxide is injected into the molten sulfur line through a mixing tee. The sulfur is at a temperature of about 150°C. and 20 psig. The resulting mixture is then passed through the line to the molten sulfur storage tanks where the sulfur is heated to maintain it molten for transfer into shipping tanks.

The molten sulfur is thereafter solidified, preferably by quenching it with water using the apparatus and method described in U.S. Pat. No. 3,637,351 to prepare Popcorn brand of sulfur particles. The resulting particulate sulfur is thereafter ground in the conventional manner to prepare sulfur powder, the weight majority, and most preferably, 98 weight percent, of which pass a 325 mesh screen. The resultant sulfur powders will be observed to have substantially no tendency to cake or agglomerate and will remain free flowing.

The invention will now be exemplified by the following experiments which demonstrate the invention and results obtained thereby.

EXAMPLE 1

Separate portions of sulfur obtained from the solidification of molten sour gas sulfur were melted and subjected to the following treatments:

a. sulfur dioxide for 1 hour;
b. air for 1 hour;
c. air for 2.5 hours;
d. no oxidizing agent.

After the aforeindicated treatments the molten sulfur samples were solidified and ground in a sample mill to provide powders, the weight majority of which were of a size sufficient to pass a 100 mesh screen.

Small plastic bags approximately 4 inches wide and about 8 inches long were filled with equal weight amounts of the sulfur powder and sealed. The bags were then placed on a flat surface, a tray was placed over them and sufficient weight was placed on the tray to produce a pressure of about 1 psi on the sulfur bags, closely approximating the total pressure applied to the lowest bag of a pallet loaded with bags of dusting sulfur. The bags remained covered for a 2-week storage period and were thereafter uncovered and tested for caking tendency. The inspection of the bags of sulfur after the aforedescribed storage treatment revealed that the sulfur which had been treated with sulfur dioxde for a period of one hour had a substantially decreased tendency to cake and approximated the anti-caking resistance of ground Frasch sulfur. It was also observed that the treatment with air for 2.5 hours similarly reduced the tendency of the sulfur to cake.

Various other oxidizing agents can be used to achieve similar results. Thus, nitrogen dioxide and/or nitric oxide can be introduced into contact with the molten sulfur at a temperature of about 150°C. for a period of about 60 minutes and it would be observed that the sulfur so treated can be ground into sulfur powders having a substantially reduced tendency to cake or form agglomerates during its storage.

EXAMPLE 2

In another experiment, particles of sulfur were melted and hydrogen sulfide was bubbled into the sulfur at 150°C. and atmospheric pressure to saturate the sulfur with hydrogen sulfide. A portion of the sulfur was removed and cooled to room temperature. Other portions of the sulfur were purged with sulfur dioxide for one hour, air for one hour and air for 2.5 hours while at 150°C. These portions were then cooled to room temperature. The solid sulfur resulting from these treatments were comminuted in a sample mill to obtain a weight majority passing a 100 mesh screen and the resulting powders were placed in the plastic bags and evaluated for caking tendency by the method described in Example 1.

It was observed that the treatment with hydrogen sulfide greatly increased the caking of the sulfur. The treatment of the hydrogen sulfide saturated sulfur with sulfur dioxide for one hour and air for 2.5 hours significantly reduced the caking of the sulfur, the sulfur dioxide being the most effective. Treatment with air for only 1 hour failed to achieve a measurable decrease in caking, apparently because of the high hydrogen sulfide content of the sulfur. Treatment at higher pressures or temperatures or with facilities for more thorough mixing of the air and molten sulfur would have enhanced the oxidation so that even treatment with air for one hour would have been equally effective.

The preceding specific illustrations of the invention are not intended to be unduly limiting thereof. Instead, it is intended that the invention be defined by the steps and reagents, and their obvious equivalents, set forth in the following claims.

We claim:

1. A method for producing finely ground sulfur free of any tendency to form cakes upon storage from sour gas sulfur having the tendency to form cakes on storage and containing hydrogen sulfide in an amount up to about 0.1 weight percent and sufficient to cause the formation of said cakes upon storage of finely ground sulfur prepared directly from said sour gas sulfur, which method comprises contacting said sour gas sulfur in a molten state and at a temperature from 119° to about 200°C. with a hydrogen sulfide oxidizing agent selected from the class consisting of nitric acid, sulfuric acid, perchloric acid, sulfur dioxide, molecular oxygen, nitric oxide, nitrogen dioxide, nitrogen tetroxide, ozone and mixtures thereof in amounts from about 0.2 to about 10 weight parts of oxidizing agent per 100 weight parts of sulfur, and for a period of from 1 to about 500 minutes sufficient to oxidize said hydrogen sulfide, removing the sulfur from the oxidation step, solidifying the sulfur and thereafter pulverizing and comminuting the sulfur to a particle size from .001 to about .01 inch to form said finely ground sulfur having a substantially reduced tendency to form cakes upon storage.

2. The method of claim 1 wherein said treatment is performed at a temperature from 149° to about 154°C.

3. The method of claim 1 wherein said treatment is performed with at least about 0.5 equivalent weight of oxidizing agent per mol weight of hydrogen sulfide in said sulfur.

4. The method of claim 1 wherein said treatment is performed with at least about one equivalent weight per mol weight of hydrogen sulfide in said sulfur.

5. The method of claim 3 wherein said treatment is performed with no greater than about 3.0 equivalent weights of oxidizing agent per mol weight of hydrogen sulfide in said sulfur.

6. The method of claim 4 wherein said treatment is performed with no greater than about 2.0 equivalent weights of oxidizing agent per mol weight of hydrogen sulfide in said sulfur.

7. The method of claim 1 wherein said oxidizing agent is sulfur dioxide.

8. The method of claim 1 wherein said oxidizing agent is gaseous at the contacting temperature and is selected from the class consisting of molecular oxygen, ozone, sulfur dioxide, nitric oxide, nitrogen dioxide, dinitrogen tetraoxide and mixtures thereof.

* * * * *